(12) United States Patent
Beck et al.

(10) Patent No.: US 9,727,201 B2
(45) Date of Patent: Aug. 8, 2017

(54) CONTEXTUAL HELP

(71) Applicant: MICROSOFT TECHNOLOGY LICENSING, LLC, Redmond, WA (US)

(72) Inventors: Brian D. Beck, Woodinville, WA (US); Stephen D. Bader, Seattle, WA (US); Deana Fuller, Seattle, WA (US); Steven Frederickson, Seattle, WA (US); Gregory T. Mattox, Jr., Bellevue, WA (US); Carmen Quan, Bellevue, WA (US); Srinivas Chakravarthula, Redmond, WA (US); Ross N. Luengen, Sammamish, WA (US); Akshatha Kommalapati, Kirkland, WA (US); J Craig Hally, Sammamish, WA (US); Song Zou, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

(21) Appl. No.: 14/675,969

(22) Filed: Apr. 1, 2015

(65) Prior Publication Data

US 2016/0291802 A1    Oct. 6, 2016

(51) Int. Cl.
*G06F 3/00* (2006.01)
*G06F 3/0481* (2013.01)
*G06F 3/14* (2006.01)
*G06F 9/44* (2006.01)
*G06F 9/445* (2006.01)

(52) U.S. Cl.
CPC .............. *G06F 3/0481* (2013.01); *G06F 3/14* (2013.01); *G06F 9/4443* (2013.01); *G06F 9/4446* (2013.01); *G06F 9/4451* (2013.01)

(58) Field of Classification Search
CPC ..................................................... G06F 3/0481
USPC .......................................................... 715/712
See application file for complete search history.

(56) References Cited

U.S. PATENT DOCUMENTS

| 6,452,607 | B1 |   | 9/2002  | Livingston |
|-----------|----|---|---------|------------|
| 6,542,163 | B2 |   | 4/2003  | Gorbet et al. |
| 6,842,877 | B2 |   | 1/2005  | Robarts et al. |
| 7,016,944 | B1 |   | 3/2006  | Meyer et al. |
| 7,047,498 | B2 |   | 5/2006  | Lui et al. |
| 7,143,362 | B2 | * | 11/2006 | Dieberger ......... G06F 17/30696 715/707 |
| 7,415,696 | B2 |   | 8/2008  | Cohen et al. |
| 7,526,722 | B2 |   | 4/2009  | Wadhwa |

(Continued)

OTHER PUBLICATIONS

"International Search Report and Written Opinion Issued in PCT Application No. PCT/US2016/024402", Mailed Date: May 19, 2016, 12 Pages.

(Continued)

*Primary Examiner* — William Titcomb
(74) *Attorney, Agent, or Firm* — Shook, Hardy & Bacon L.L.P.

(57) ABSTRACT

Contextual help is provided in an unobtrusive manner. The optimum point in time for displaying a help notification is determined by triggers associated with each help notification. The triggers may take into account various factors, such as the action currently being performed by the user, whether the tip has been presented to the user before, the user's past experience with the feature, and so forth.

20 Claims, 5 Drawing Sheets

(56) References Cited

U.S. PATENT DOCUMENTS

| | | | |
|---|---|---|---|
| 7,581,181 B2 | 8/2009 | White | |
| 7,865,829 B1* | 1/2011 | Goldfield | G06F 9/4446 715/708 |
| 8,001,470 B1* | 8/2011 | Chen | G06F 9/4446 715/705 |
| 8,010,903 B2* | 8/2011 | Dieberger | G06F 3/0485 715/707 |
| 8,010,969 B2* | 8/2011 | Hankins | G06F 11/3466 712/235 |
| 8,151,192 B2* | 4/2012 | Black | G06F 9/4446 715/705 |
| 8,161,386 B1* | 4/2012 | Mark | G06F 9/4446 715/705 |
| 8,458,592 B2* | 6/2013 | Farrington | G06F 3/0481 715/705 |
| 9,026,910 B2* | 5/2015 | Lu | G06F 9/4446 715/708 |
| 2004/0266491 A1* | 12/2004 | Howard | H04H 20/86 455/567 |
| 2005/0081152 A1* | 4/2005 | Commarford | G06F 9/4446 715/705 |
| 2005/0138559 A1* | 6/2005 | Santos-Gomez | G06F 9/4446 715/709 |
| 2007/0061723 A1* | 3/2007 | Ohga | G06F 9/4443 715/705 |
| 2012/0311045 A1 | 12/2012 | Sylvain | |
| 2013/0325922 A1 | 12/2013 | Chaudhri et al. | |
| 2014/0188541 A1 | 7/2014 | Goldsmith et al. | |
| 2014/0199663 A1 | 7/2014 | Sadeh-Koniecpol et al. | |
| 2014/0372850 A1 | 12/2014 | Campbell et al. | |

OTHER PUBLICATIONS

Vallina-Rodriguez, et al., "The case for Context-Aware Resources Management in Mobile Operating Systems", In Proceedings of Mobile Context Awareness, Apr. 23, 2012, 17 pages.

"App Structure for Android Wear", Published on: Jul. 16, 2014 Available at: https://developer.android.com/design/wear/structure.html.

"Context Awareness on Android Wear", Retrieved on: Mar. 3, 2015 Available at: https://developer.android.com/design/wear/context.html.

Sotsenko, A., Jansen, M., Milrad, M. (2013), "About the Contextualization of Learning Objects in Mobile Learning Settings", In: QScience Proceedings: vol. 2013, 12th World Conference on Mobile and Contextual Learning (mLearn 2013) (pp. 67-70). Qatar QScience Proceedings http://dx.doi.org/10.5339/qproc.2013.mlearn.11.

Oliver, Sean, "Q&A: Tips for Planning Your Cross-Device Marketing Strategy", Published Oct. 20, 2014, 5 pages. http://blog.optimizely.com/2014/10/20/qa-tips-for-planning-your-cross-device-marketing-strategy/.

* cited by examiner

CONTEXTUAL HELP

BACKGROUND

Products such as operating systems and computer applications have traditionally provided some form of help feature or documentation to assist a user in learning how to use the product. Such help features typically respond to direct inquiries from a user, such as a selection made from a help menu or a term entered into a help search function. Tutorials have also been provided, either online or client based, in which a user reads help documentation and participates in step-by-step exercises to become familiar with the product.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter. The technology described herein provides contextual help in an unobtrusive manner. The optimum point in time for displaying a help notification is determined by triggers associated with each help notification. The triggers may take into account various factors, such as the action currently being performed by the user, whether the tip has been presented to the user before, the user's past experience with the feature, and so forth.

The contextual help optimizes users' interactions with graphical user interface components on their computing device, and may introduce users to more efficient and/or different applications for performing a task. The contextual help may also advise users of features that have changed when the user has upgraded to a new version of an operating system, application, and so forth. The optimum point in time for displaying a help notification is determined by triggers. The help notifications, which include suggestions, tips, explanations, instructions, and so forth, may be described as creatives herein. In an embodiment, a creative includes any of one or more show-trigger rules, one or more dismiss-trigger rules, one or more withdraw-trigger rules, a message sentiment, and a graphic that illustrates the tip.

BRIEF DESCRIPTION OF THE DRAWINGS

Aspects of the technology described in the present application are described in detail below with reference to the attached drawing figures, wherein.

DETAILED DESCRIPTION

Figure 1:
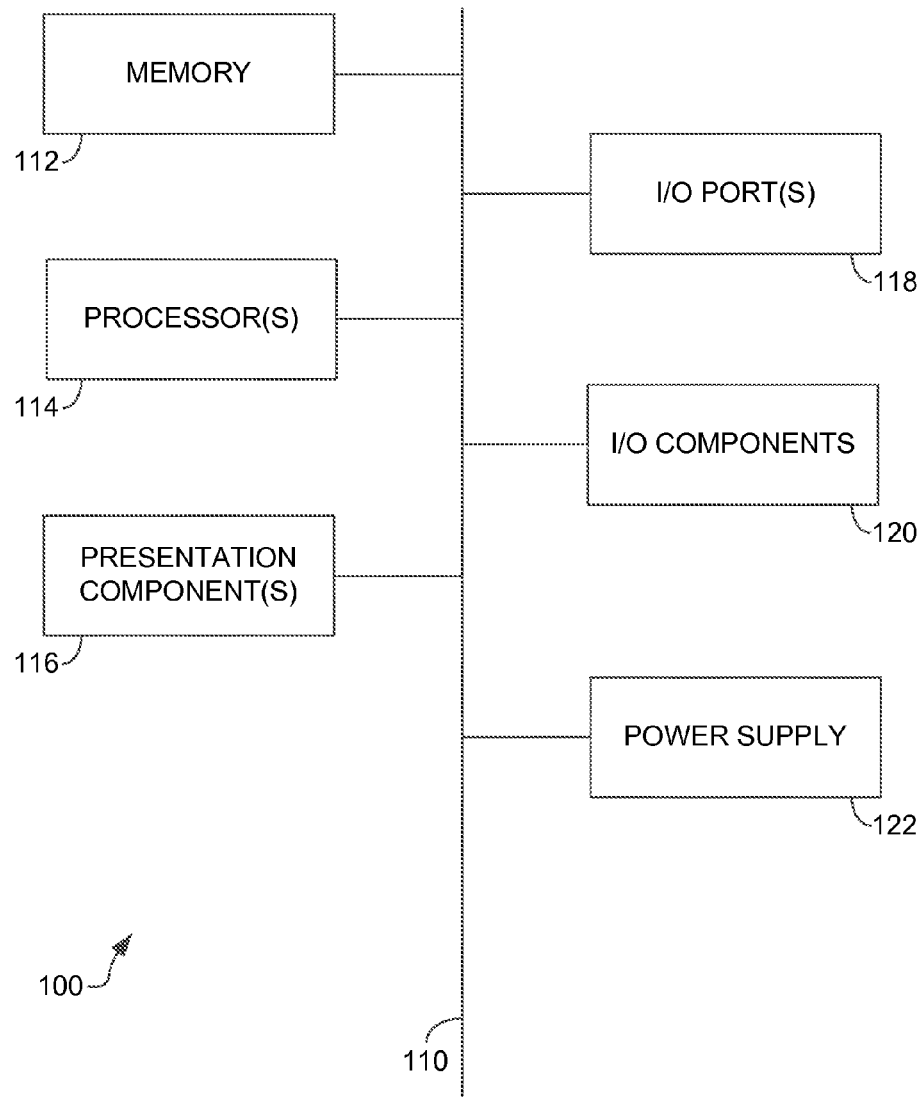
FIG. 1 is a block diagram of an exemplary computing environment suitable for implementing aspects of the technology described herein.

The technology of the present application is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In an embodiment, the contextual help system adapts to each user and provides contextual help in an unobtrusive manner. Contextual suggestions, or tips, are provided to a user only when relevant to that user. As such, the contextual help system blends with the natural exploration phase that new users experience, allowing users to discover features of the product on their own while the system offers help when needed. The contextual help is thus spread out over time, rather than presented to the user as a multitude of help suggestions within a brief period. The contextual help system utilizes segmentation to determine whether, and/or when, to present a help notification to a user. Segmentation includes applying rules to known information regarding, for example, a specific device and/or user, to determine whether a particular help notification is appropriate and/or timely. Segmentation may also be referred to as targeting.

The contextual help optimizes users' interactions with graphical user interface components on their computing device, and may introduce users to more efficient and/or different applications for performing a task. The contextual help may also advise users of features that have changed when the user has upgraded to a new version of an operating system, application, and so forth. The optimum point in time for displaying a help notification is determined by triggers. The help notifications, which include suggestions, tips, explanations, instructions, and so forth, may be described as creatives herein. In an embodiment, a creative includes any of one or more show-trigger rules, one or more dismiss-trigger rules, one or more withdraw-trigger rules, a message sentiment, a graphic that illustrates the tip, and relative positioning data.

The triggers are rule-based to provide tips that feel contextually relevant and to ensure a custom experience for every user. For example, the rules may ensure that users never see the same message twice, e.g., the help system keeps track of which tips have already been presented to a user, and may not present the same tip twice. Similarly, if a user has already discovered a particular feature on their own, the contextual help system may not attempt to introduce them to the feature. Alternatively, if a tip has been presented once, and the user has not accessed the feature within some predetermined time frame, the tip may be presented one or more additional times before being disabled. If a user's device is not eligible for a given feature, the contextual help system may not notify the user of the feature. The contextual help system may also track the user's actions on multiple devices as well as which tips have been presented on each of the multiple devices. In that way, if a given tip was already presented to the user on another device, or the user already discovered the feature on another device, the tip may not be presented to the user on the current device. The rules may also prevent a user from being overwhelmed with messages or tips within a given period of time.

Targeting rules are used in conjunction with campaigns. In an embodiment, a campaign is a collection of one or more creatives directed toward a specific audience based on targeting rules. Targeting rules may ask questions such as: Is this feature available in this user's market? Does this feature work on this user's machine? Is this user eligible to receive this message? Other factors may also be considered in determining whether a tip is appropriate for a particular audience.

Show-trigger rules determine when a particular tip should be presented. These rules may track a number of conditions, such as the passage of time, previous operating systems used by the user, a user's actions, and so forth, to determine the current user context, and utilizes that understanding to determine when is the best time to launch a given tip. Because of the various conditions taken into consideration, and because the factors are very specific to each scenario, the triggering rules make the suggestions and tips feel contextual to the user. As mentioned above, one factor that may be considered by the triggering rules is the passage of time. In an embodiment, an amount of elapsed time alone is not enough to trigger a tip (e.g., show the tip on day three after initial setup). Triggers may depend on an elapsed time in combination with one or more other factors. For example, if the user is on day three of using the most recent version of an OS, the user has not yet seen a new "quick actions" feature, and the user has changed a particular setting the long way three times, and if the user begins to change the setting the long way a fourth time, then present a tip about quick actions which will enable the user to more efficiently change the particular setting.

Dismiss-trigger rules determine when a help notification currently presented on the UI should be removed from the UI (but not necessarily eliminated from future consideration and presentation). For example, when a help notification is displayed, a dismiss-trigger rule might be "close the notification if the user clicks on the UI outside the boundaries of the help notification." Another dismiss-trigger rule might be "close the notification if the user accesses a feature associated with the help notification."

Relative positioning data is used to determine where the creative should be shown to place the creative within the user's field of view or in close proximity to the subject of the tip. The relative positioning data can be predefined coordinates or a unique identifier allowing the system to find an element anywhere on screen. In an embodiment, it would allow the system to place a creative next to the UI element the user just interacted with to help ensure the tip isn't missed due to it being placed outside the user's active field of view. In one embodiment, the creative is presented in the form of a temporary popup window or similar type of message holder. An arrow, or tail, may protrude or extend from a side or portion of the popup window, pointing or anchoring to the UI element or other feature to which the notification applies.

Withdraw-trigger rules assist in making the contextual help system feel responsive and unobtrusive. In an embodiment, when a withdraw trigger is satisfied, the associated help notification, or creative, is disabled such that it is no longer eligible for presentation to the user. For example, if a particular help notification tells a user how to launch a particular application, a withdraw trigger might be the launching of the application by the user. Thus, when the system detects that the user has launched the application, the withdraw trigger is satisfied and the associated help notification, or creative, is withdrawn from future consideration. In an embodiment, the withdraw trigger for a given help notification may be satisfied even before the help notification is shown to the user a first time, in which case the help notification would never be presented to the user. A creative may be disabled by means of setting or clearing a flag, by removing the creative from the campaign stored on the user's device, or by other means of eliminating the creative from future consideration for presentation to the user.

Based on targeting rules, as described above, a campaign may include creatives that are specific to users and/or devices meeting criteria such as region, operating system (OS) upgrade path, device type, device capabilities, user subscriptions, and so forth. Thus, a campaign may only be pushed to users/devices that meet the designated criteria.

In an embodiment, a first campaign may be pushed to a user that has upgraded from a previous version "A" of an OS to a current version of the OS (a first OS upgrade path). The help notifications included in the campaign may be tailored to include scenarios specific to those users. For example, some features from the previous version of the OS may no longer exist in the current version of the OS. Help notifications associated with such features may have triggers based on attempts by the user to access those features. In one embodiment, a feature in the previous version may have been accessed by a user action, such as swiping from the right side of the user interface (UI). An appropriate trigger (described generically) might be "the user swiped from the right side of the UI." Thus, when the user swipes from the right side of the UI, the trigger is satisfied and the contextual help system presents an appropriate help notification that is associated with the trigger. For example, the help notification might display a message acknowledging the user's attempted action and explaining that the feature no longer exists, and/or explaining how to access the same or similar functionality in the current version of the OS.

In another embodiment, a second campaign is targeted toward users that have upgraded from a version "B" of the OS to the current version. In version B, a swipe from the right might have performed a different function than in version A. Thus, in the second campaign the same trigger may be associated with a different help notification than in the first campaign, such as a message that introduces the user to the new feature and/or tells the user where to find more information about the new feature.

In another embodiment, a third campaign is targeted toward users that have purchased a new computer (or other device) and have no experience with previous versions of the OS. In such a campaign, the help notifications may not include a trigger based on swiping from the right side of the UI, because the user would not be expected to associate the gesture with a feature of a previous version.

The first, second, and third campaigns may share some help notifications that use the same triggers. For example, the current version of the OS may include a new feature that was not in the previous versions, which would thus be new to a user regardless of whether the user had used a previous version of the OS. A possible trigger could be "ten days have passed since the user began using the system, and the user has not yet accessed the new feature." The associated help notification may briefly describe the new feature and explain how to access it. Examples of help notifications may also include introductions to various features in response to time-based triggers.

Targeting campaigns to people that meet certain criteria prevents unneeded help notifications from being displayed to a user. For example, a campaign may not include help for features which the user should already be familiar with, based on the features' presence in an operating system version the user has already been using. The campaign also saves computing memory by not storing unneeded creative on a user's device. As mentioned above, a withdraw trigger may also prevent certain help notifications from being displayed to a user. However, whereas a withdraw trigger may disable a creative that has been downloaded to the user's device, the targeting of campaigns may prevent unneeded creatives from being downloaded to the user's device at all.

In an embodiment, campaigns are registered with an online service, and a client downloads an appropriate campaign onto the user's device. The user's actions are monitored, and when a determination is made that a trigger event or trigger condition corresponding to a particular tip has occurred, the tip is presented on the user interface. Different users may see tips at different times based on when they activate associated triggers. As described above, the triggers may take into account various factors, such as the action currently being performed by the user, whether the tip has been presented to the user before, the user's past experience with the feature associated with the tip, device capabilities, activities performed by the user on another device, and so forth. The contextual help system may be used to teach a user about a new operating system, system updates, application updates, and so forth. The factors considered when triggering a tip ensure that the contextual learning provided is relevant to the particular user.

In an embodiment, a courtesy engine orchestrates the entirety of the contextual help system. It may employ segmentation and/or oversee the release of campaigns to the appropriate audiences, coordinates cross-device contextual help across multiple devices associated with the same user. In one embodiment, the courtesy engine tracks the messages a user may have seen on another device so that, for example, the user isn't presented with a tip on one device, then presented with the same tip again on a second device. The courtesy engine may also use a governor to limit the total number of help notifications displayed to a user in a given time period. In an embodiment, multiple campaigns may be loaded on a single device, with each campaign including multiple creatives and each creative having one or more triggers. The governor may track activities across campaigns and impose an overall constraint on the contextual help campaigns. For example, the governor may prevent more than five creatives from being displayed to a user within a four-hour period. In another aspect, a usage session, rather than a time period, determines the maximum number of creatives that are presented to a user. A usage session may be defined as a consecutive usage period on the computing device that ends once a user takes a break. A break may be detected by the lack of input into the computing device from the user. Once input is received after a break, a new usage session may be started.

Having briefly described an overview of aspects of the technology described herein, an exemplary operating environment suitable for use in implementing the technology is described below.

Exemplary Operating Environment

Referring to the drawings in general, and initially to FIG. 1 in particular, an exemplary operating environment for implementing aspects of the technology described herein is shown and designated generally as computing device 100. Computing device 100 is but one example of a suitable computing environment and is not intended to suggest any limitation as to the scope of use or functionality of the technology described herein. Neither should the computing device 100 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in.

Illustrative I/O components include a microphone, joystick, game pad, satellite dish, scanner, printer, display device, wireless device, a controller (such as a stylus, a keyboard and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 114 may be direct or via a coupling utilizing a serial port, parallel port, and/or other interface and/or system bus known in the art. Furthermore, the digitizer input component may be a component separated from an output component such as a display device or, in some embodiments, the usable input area of a digitizer may be co-extensive with the display area of a display device, integrated with the display device, or may exist as a separate device overlaying or otherwise appended to a display device. Any and all such variations, and any combination thereof, are contemplated to be within the scope of embodiments of the technology described herein.

A NUI processes air gestures, voice, or other physiological inputs generated by a user. Appropriate NUI inputs may be interpreted as ink strokes for presentation in association with the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

A computing device may include a radio. The radio transmits and receives radio communications. The computing device may be a wireless terminal adapted to received communications and media over various wireless networks. Computing device 1100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Contextual Help System

Figure 2:
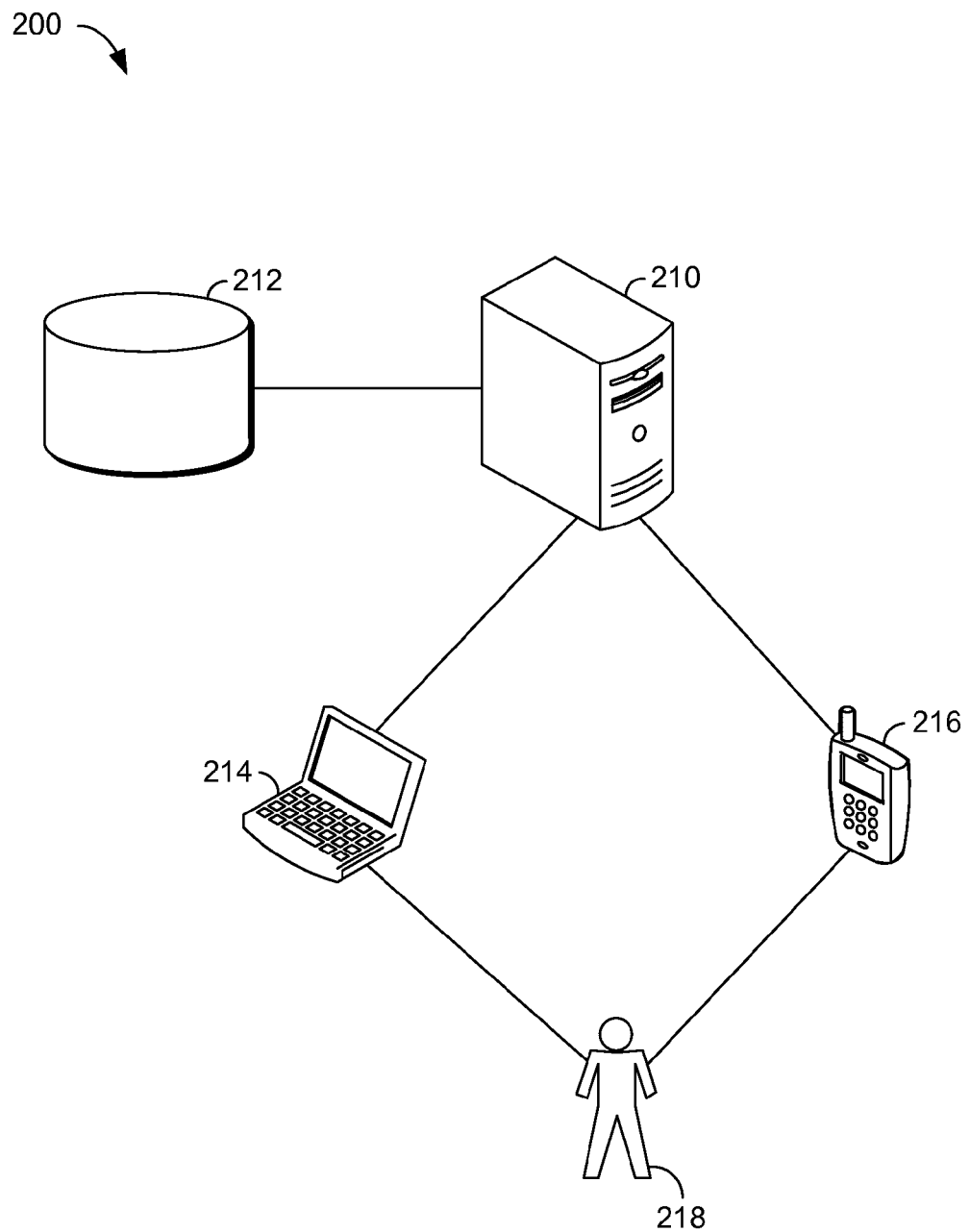
FIG. 2 is a diagram depicting an exemplary system for providing contextual help in accordance with an embodiment of the technology described herein.

Referring now to FIG. 2, an exemplary system 200 is depicted for providing contextual help in accordance with an embodiment of the technology described herein. System 200 is but one example of a suitable system and is not intended to suggest any limitation as to the scope of use of the technology described herein. Neither should system 200 be interpreted as having any dependency or requirement relating to any one or combination of components illustrated.

System 200 includes a server 210 and a database 212. Database 212 may be contained within a single device or distributed across multiple devices, which may include one or more memory devices. Database 212 may be separate from server 210 or included as part of server 210. In an embodiment, database 212 stores a plurality of campaigns. Each campaign includes one or more creatives that associate contextual triggers with help notifications. Each campaign may be targeted toward a specific audience, as described above, such that the creative in the campaign are specific to a particular audience. Within a given campaign, the triggers indicate when to display or not display a help notification to a user. Some campaigns may not be targeted, but instead may be applicable to a general audience.

In an embodiment, server 210 communicates with database 212 to retrieve campaigns which may be downloaded to user devices, such as a user device 214 and a user device 216. In an embodiment depicted in FIG. 2, user device 214 and user device 216 are associated with the same user 218, i.e., user 218 owns and/or has accounts/subscriptions associated with both user devices 214 and 216. In some embodiments, a user may only be associated with one device. Server 210 may maintain or access a user profile associated with user 218 to determine what devices, past and present, have been associated with user 218. Additionally, the user profile may include various demographic data about user 218 such as geographical region, user preferences, Web browsing history, purchases, usage of previous operating systems and applications, and so forth. As described above, campaigns may be targeted to specific audiences. In an embodiment, server 210 determines to which audience (or audiences) user 218 belongs, based on what is known about user 218, and selects a campaign from database 210 that is targeted to the determined audience. The server communicated that selected campaign to user devices 214 and 216. A client residing on the user devices may track the actions of user 218 on the devices and determine when triggers associated with the help notifications contained in the downloaded campaign stored in user devices 214 and 216 are satisfied.

In an embodiment, the help notifications in the campaign downloaded to user devices 214 and 216 are associated with "show triggers" and "withdraw triggers." When a show trigger is satisfied, it indicates that the help notification associated with the show trigger should be presented to the user. When a withdraw trigger is satisfied, it indicates that the help notification associated with the withdraw trigger should be disabled such that the help notification is removed from future consideration for presentation to the user. In one embodiment, the help notification is disabled by means of a flag or other indication that it has been disabled. In another embodiment, the help notification is disabled by removing it from the campaign stored on the user device.

In an embodiment, system 200 provides contextual help to user 218 across multiple devices, e.g., user devices 214 and 216, such that user 218 does not receive redundant help notifications when switching from one device to the other. For example, user 218 may upgrade user devices 214 and 216 to the current OS version. While using user device 214, a show trigger may cause a help notification to be presented to user 218 introducing a new feature in the current OS version. The act of the user viewing the help notification and/or viewing the new feature on user device 214 may satisfy a withdraw trigger for that help notification. Server 210 may receive a notification from user device 214 that the withdraw trigger for the help notification is satisfied on user device 214. Based on that notification, server 210 sends a notification to the user device 216 that the withdraw trigger for the help notification is satisfied. Thus, when user 218 switches to user device 216, he or she will not be presented with the same help message introducing the new feature.

Figure 3:
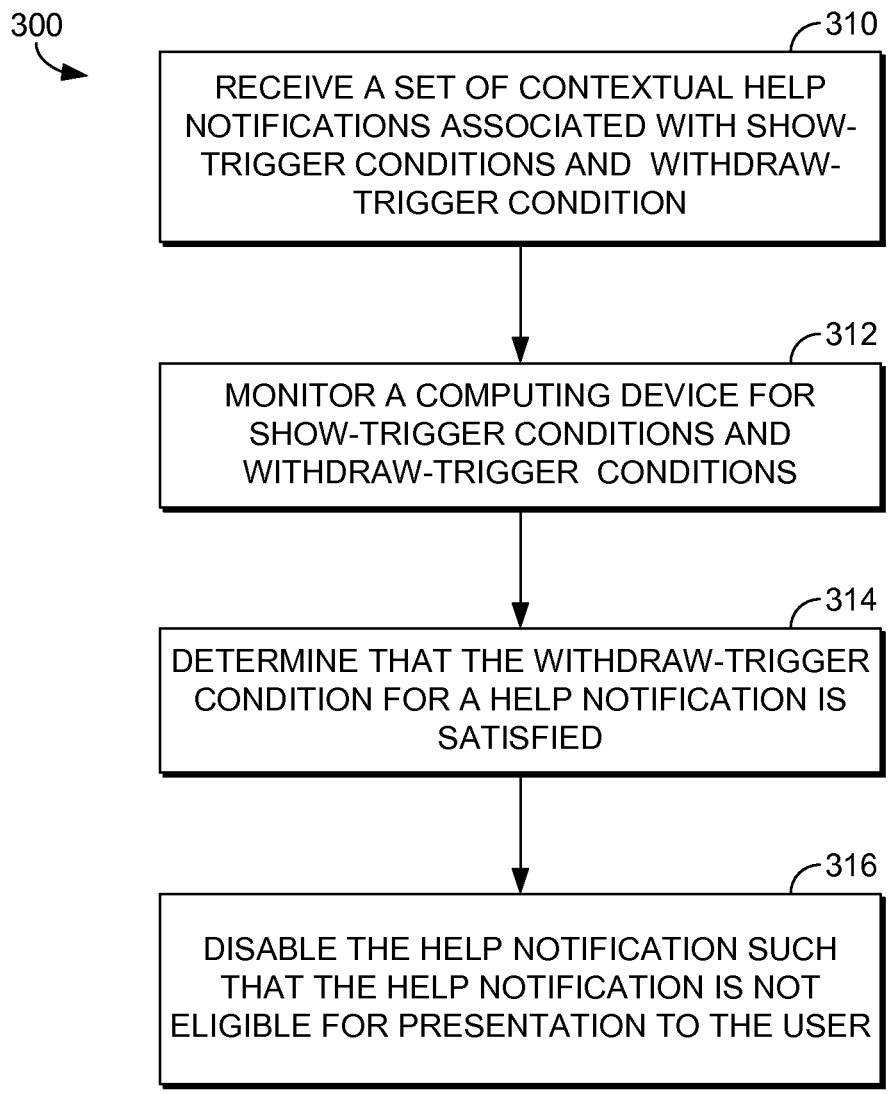
FIG. 3 is a diagram depicting an exemplary method for providing contextual help in accordance with an embodiment of the technology described herein.

Referring now to FIG. 3, an exemplary method is depicted for providing contextual help for a computing device in accordance with an embodiment of the technology described herein, and is designated generally as method 300. Method 300 is but one example of a suitable method and is not intended to suggest any limitation as to the scope of use of the technology described herein. Neither should the method 300 be interpreted as having any dependency or requirement relating to any one or combination of components illustrated.

At a step 310, the computing device receives a set of contextual help notifications for presentation to a user on the computing device. In an embodiment, the contextual help notifications are organized into a campaign that is directed at a specific audience of users, which is determined based on at least one of region, operating system upgrade path, device type, device capabilities, or user subscriptions. Each help notification may be associated with one or more show-trigger conditions and withdraw-trigger conditions. The show-trigger conditions, when satisfied, indicate that the help notification should be presented on a user interface of the computing device, and may include one or more of an action currently being performed by the user on the computing device, an action previously performed by the user on the computing device, an action performed by the user on another device, the user's past experience with a feature associated with the help notification, a predetermined amount of time having elapsed since a predetermined event occurred, and so forth. In one embodiment, if a determination is made that a predetermined amount of time has passed since a predetermined event, and the user has not performed a predetermined action, an associated help notification is presented to the user. In another embodiment, a given help notification may be presented if a predetermined amount of time has passed since a predetermined event, or if the user performed a predetermined action. While presenting a help notification on the user interface, if a dismiss-trigger condition associated with the help notification occurs, then the help notification may be removed from the user interface (but not necessarily eliminated from future consideration and presentation). The withdraw-trigger condition, when satisfied, indicates that the help notification should be disabled such that the help notification is not eligible for presentation on the user interface. In one embodiment, the help notification is disabled by means of a flag setting. In another embodiment, the help notification is disabled by removing or deleting it from the computing device.

At a step 312, the computing device is monitored for show-trigger conditions and withdraw-trigger conditions. In an embodiment, the monitoring is performed by a client residing on the computing device. The client may communicate with a server that coordinates the communication of campaigns to computing devices, and also coordinates the contextual help across multiple devices belonging to the same user. In an embodiment, the monitoring includes communicating a result of the monitoring to the server.

At a step 314, a determination is made that the withdraw-trigger condition for a first help notification is satisfied prior to presenting the first help notification to the user. At a step 314, upon the determination that the withdraw-trigger condition is satisfied, the first help notification is disabled such that the first help notification is not eligible for presentation on the user interface.

Figure 4:
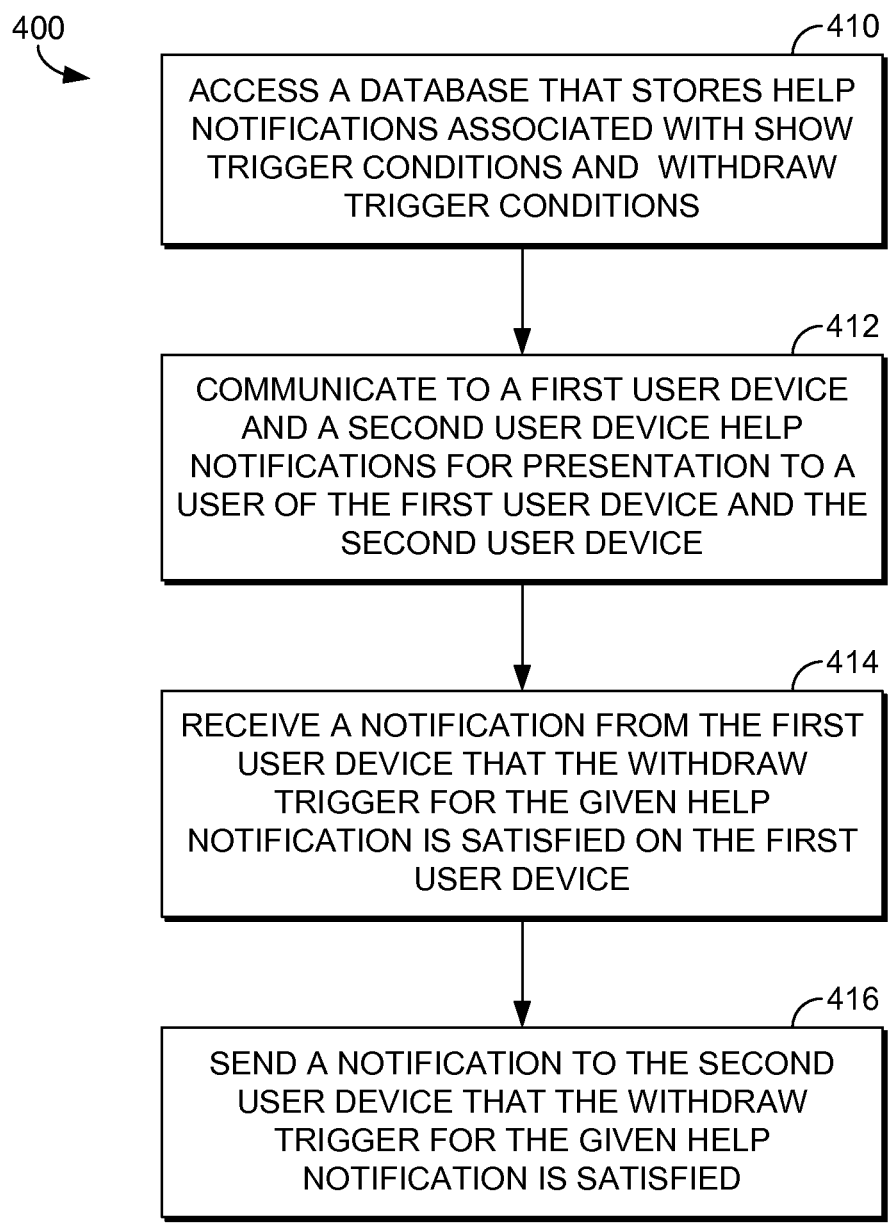
FIG. 4 is a diagram depicting an exemplary method for providing contextual help in accordance with an embodiment of the technology described herein.

Referring now to FIG. 4, an exemplary method is depicted for providing contextual help for a computing device in accordance with an embodiment of the technology described herein, and is designated generally as method 400. Method 400 is but one example of a suitable method and is not intended to suggest any limitation as to the scope of use of the technology described herein. Neither should the method 400 be interpreted as having any dependency or requirement relating to any one or combination of components illustrated.

At a step 410, a server accesses a database that stores help notifications for providing contextual help. In one embodiment, the help notifications stored in the database are organized into campaigns that are each directed toward a respective audience of users. The respective audiences may be determined based on at least one of region, operating system upgrade path, device type, device capabilities, user subscriptions, and so forth. Each help notification may be associated with one or more show triggers which, when satisfied, indicate that the help notification should be presented to the user. The show triggers may include one or more of an action currently being performed by the user on the computing device, an action previously performed by the user on the computing device, an action performed by the user on another device, the user's past experience with a feature associated with the help notification, and so forth. Each help notification may also be associated with a withdraw trigger which, when satisfied, indicates that the help notification should be disabled such that the help notification is not eligible for presentation to the user. The withdraw trigger prevents the same help notification from being needlessly repeated.

At a step 412, one or more of the help notifications is communicated to a first user device and a second user device for presentation to a user. In an embodiment, the first user device and the second user device are both associated with the same user. A user profile may be utilized to identify the audience to which the user belongs, and the one or more of the help notifications may be selected from the campaign that is targeted toward the identified audience.

At a step 414, a notification is received from the first user device that the withdraw trigger for a first help notification is satisfied on the first user device. At a step 416, based on receiving the notification from the first user device, a notification is sent to the second user device that the withdraw trigger for the first help notification is satisfied. As described above, the withdraw trigger prevents the same help notification from being repeatedly presented to the user. Notifying the second user device that the withdraw trigger for the first help notification is satisfied, based on the conditions on the first user device, also prevents the help notification from being shown to the user on the second user device.

Figure 5:
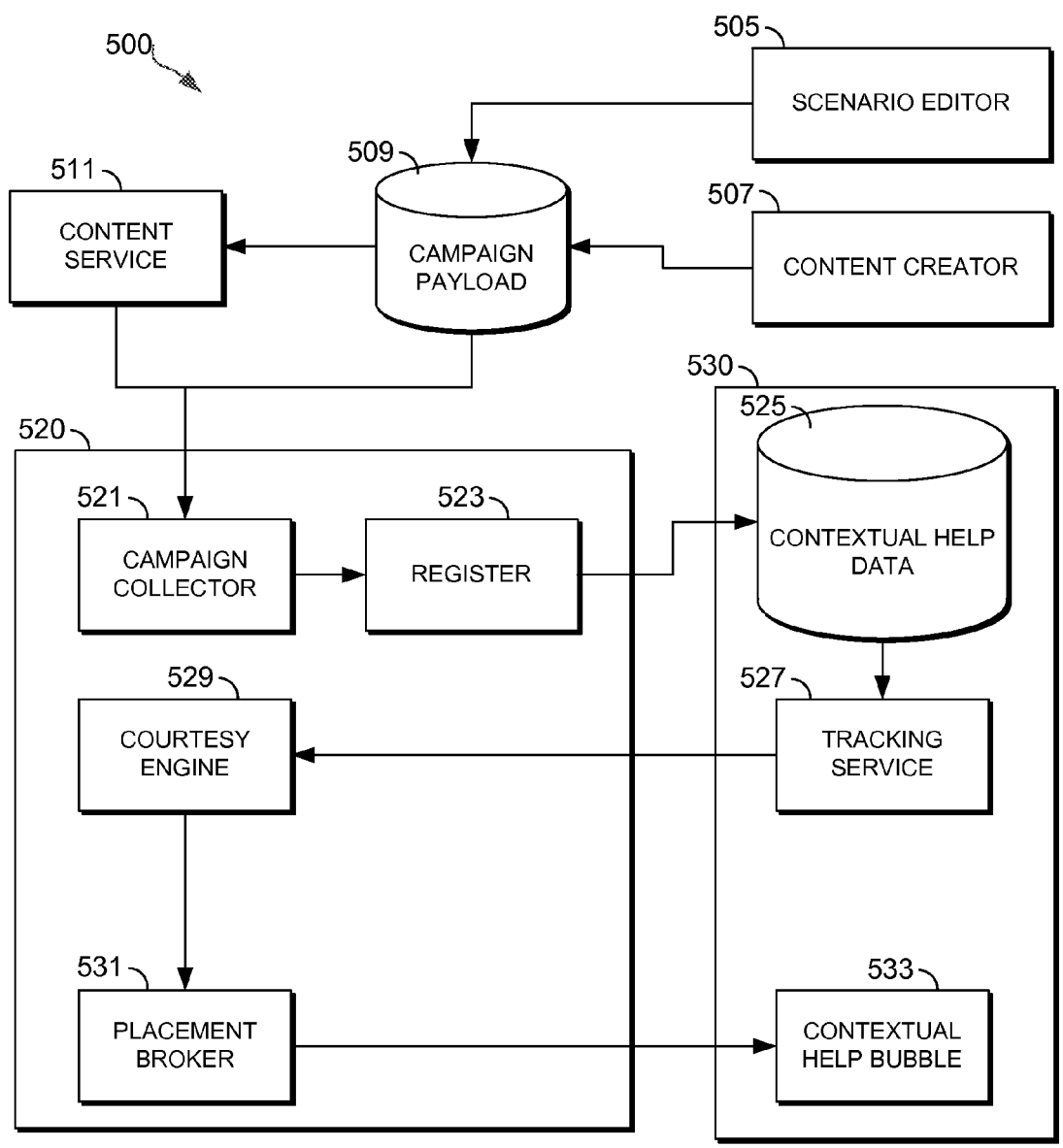
FIG. 5 is a diagram depicting an exemplary system for providing contextual help in accordance with an embodiment of the technology described herein.

Referring now to FIG. 5, an exemplary system 500 is depicted for providing contextual help in accordance with an embodiment of the technology described herein. System 500 is but one example of a suitable system and is not intended to suggest any limitation as to the scope of use of the technology described herein. Neither should system 500 be interpreted as having any dependency or requirement relating to any one or combination of components illustrated.

System 500 includes a content delivery manager 520 and a client device 530. The content delivery manager 520 may comprise multiple computing devices within one or more data centers. The content delivery manager 520 may communicate with the client device 530 over a wide area network, such as the Internet. The client device 530 may be associated with a user through a user account or some other mechanism. The user may have multiple devices and all of these devices may be associated with the user within the contextual help system using the user account information or some other mechanism. The client device may be similar to computing device 100 and may take the form of a smartphone, tablet, personal computer, smart watch, fitness tracker, augmented reality glasses, virtual reality headsets, and the like.

The system 500 includes a scenario editor 505 and a content creator 507. Both of these components may comprise software running on one or more computing devices within one or more data centers. In an embodiment, the content creator 507 provides an interface through which contextual help creatives can be written, edited, and/or imported. The content creator 507 may provide a graphical user interface that is accessible to a user. The graphical user interface can allow the user to generate text and images for a creative. The text and images can help the user understand a computing function for an application, operating system, or hardware component (e.g., the role of a button) on the client device 530.

The scenario editor 505 generates an interface through which scenarios may be associated with an individual creative or a group of creatives within a campaign. The scenarios include specifying show-triggers and withdraw-triggers for an individual creative and/or a campaign. The triggers may take the form of an XML file. The scenarios also include defining an audience criteria for a campaign and/or a creative. As described previously, the audience criteria may be used to determine which client devices receive which creatives and/or campaigns.

The campaign payload data store 509 stores individual creatives and campaigns along with the associated scenarios. The content service 511 may distribute campaigns and individual creatives to computing devices associated with users that match the audience criteria. In an aspect, the content service 511 communicates creatives to the campaign collection component 521 within the content delivery manager 520.

In an embodiment, the campaign collector 521 evaluates user records to determine which devices should receive which campaigns. The register component 523 may track which campaigns have been communicated to which devices. The campaign collector 521 may communicate appropriate campaigns, including the creatives within the campaign and associated triggers, to a contextual help data store 525 on a client device 530.

In an embodiment, the tracking service 527 on the client device 530 monitors events occurring on the client device 530. When an event occurs that satisfies a trigger, be it a show-trigger, a withdraw-trigger, or other type of trigger, an event notification may be sent to the courtesy engine 529. The courtesy engine 529 may track which creatives have been shown to the user across multiple devices associated with the user, including the client device 530.

In an embodiment, the courtesy engine 529 determines whether a creative associated with the event should be shown based on active courtesy criteria. When the event notification is for a withdraw-trigger, then the courtesy engine 529 may facilitate the communication of a withdraw notification to other client devices associated with the user. In an embodiment, upon receiving the withdraw notification, the associated creative is disabled to make sure that it is not shown upon satisfaction of its associated show-trigger. In one aspect, the courtesy engine 529 sends a withdraw notification to a first user device upon the display of a creative on a second user device. This ensures that the same creative is not shown to the user multiple times.

Upon confirming that a creative should be shown, the courtesy engine 529 may send a request to the placement broker 531 to generate a display location for the creative on an interface associated with the client device 530. The placement broker 531 may request interface data describing the current state of the client device's interface, including which application windows are open and their location. Alternatively, state information for the client device's interface may have been provided previously by the tracking service 527 or through some other component. The placement broker 531 then generates a placement instruction for the client device 530 that can be used in combination with the creative data stored in the contextual help data store 525 to generate a contextual help bubble 533 which is displayed at the location specified.

Embodiments

Aspects of the technology described herein can form multiple embodiments including, but not limited to, the following:

Embodiment 1. A method of providing contextual help for a computing device, the method comprising: receiving, at the computing device, a set of contextual help notifications for presentation to a user, wherein each help notification is associated with one or more show-trigger conditions which, when satisfied, indicate that the help notification should be presented on a user interface of the computing device, and a withdraw-trigger condition which, when satisfied, indicates that the help notification should be disabled such that the help notification is not eligible for presentation on the user interface; monitoring the computing device for show-trigger conditions and withdraw-trigger conditions; prior to presenting a first help notification to the user, determining that the withdraw-trigger condition for the first help notification is satisfied; upon the determination that the withdraw-trigger condition is satisfied, disabling the first help notification such that the first help notification is not eligible for presentation on the user interface.

Embodiment 2. The method of embodiment 1, wherein the contextual help notifications are organized into a campaign that is directed at a specific audience of users.

Embodiment 3. The method of embodiment 2, wherein the specific audience of users is determined based on at least one of region, operating system upgrade path, device type, device capabilities, or user subscriptions.

Embodiment 4. The method of any of the above embodiments, wherein the one or more show-trigger conditions include one or more of an action currently being performed by the user on the computing device, an action previously performed by the user on the computing device, an action performed by the user on another device, or the user's past experience with a feature associated with the help notification.

Embodiment 5. The method of any of the above embodiments, wherein monitoring the computing device comprises communicating a result of the monitoring to a server that coordinates the contextual help across multiple computing devices associated with the user.

Embodiment 6. The method of any of the above embodiments, comprising: determining that show-trigger conditions for a second help notification are satisfied, wherein the show-trigger conditions for the second help notification include a predetermined amount of time has passed since a predetermined event, and the user has not performed a predetermined action within the predetermined amount of time since the predetermined event; and presenting the second help notification on the user interface.

Embodiment 7. The method of any of the above embodiments, comprising: determining that a show-trigger condition for a second help notification is satisfied, wherein the show-trigger condition includes at least one of a predetermined amount of time has passed since a predetermined event, or determining that the user performed a predetermined action; and presenting the second help notification on the user interface.

Embodiment 8. The method of embodiment 7, further comprising: while presenting the second help notification on the user interface, determining an occurrence of a dismiss-trigger condition associated with the second help notification; and removing the second help notification from the user interface.

Embodiment 9. A method of providing contextual help for a computing device, the method comprising: at a server, accessing a database that stores help notifications for providing the contextual help, wherein each help notification is associated with one or more show triggers which, when satisfied, indicate that the help notification should be presented to the user, and a withdraw trigger which, when satisfied, indicates that the help notification should be disabled such that the help notification is not eligible for presentation to the user; communicating to a first user device and a second user device one or more of the help notifications for presentation to a user, wherein the user is associated with both the first user device and the second user device; receiving a notification from the first user device that the withdraw trigger for a first help notification is satisfied on the first user device; and based on receiving the notification from the first user device, sending a notification to the second user device that the withdraw trigger for the first help notification is satisfied.

Embodiment 10. The method of embodiment 9, wherein the help notifications stored in the database are organized into campaigns that are each directed toward a respective audience of users.

Embodiment 11. The method of embodiment 10, wherein the respective audience of users is determined based on at least one of region, operating system upgrade path, device type, device capabilities, or user subscriptions.

Embodiment 12. The method of any of embodiments 9, 10, or 11, wherein the one or more show triggers include one or more of an action currently being performed by the user on the computing device, an action previously performed by the user on the computing device, an action performed by the user on another device, or the user's past experience with a feature associated with the help notification.

Embodiment 13. The method of any of embodiments 9, 10, 11, or 12, comprising: accessing a user profile associated with the user; and identifying the audience of users to which the user belongs; wherein the one or more help notifications communicated to the first user device and the second user device are selected from the campaign that is targeted toward the identified audience.

Embodiment 14. The method of any of embodiments 9, 10, 11, 12 or 13, further comprising limiting the total number of help notifications displayed to the user in a given time period.

Embodiment 15. A system for providing contextual help for a computing device, the method comprising: a database configured to store help notifications for providing the contextual help, wherein the help notifications are organized into campaigns, wherein each campaign is directed toward a respective audience of users, and wherein each help notification is associated with a respective set of one or more show triggers which, when satisfied, indicate that the help notification should be presented to the user, and a withdraw trigger which, when satisfied, indicates that the help notification should be disabled such that the help notification is removed from future consideration for presentation to the user; and a server device configured to communicate to a first user device and a second user device one or more of the help notifications for presentation to a user, wherein the user is associated with both the first user device and the second user device, and receive a notification from the first user device that the withdraw trigger for a first help notification is satisfied on the first user device, and based on having received the notification from the first user device, send a notification to the second user device that the withdraw trigger for the first help notification is satisfied.

Embodiment 16. The system of embodiment 15, wherein each help notification is further associated with a dismiss trigger which, when satisfied, indicates that an associated help notification currently displayed on a user interface should be removed from the user interface.

Embodiment 17. The system of any of embodiment 15 or 16, wherein the respective audience of users is determined based on at least one of region, operating system upgrade path, device type, device capabilities, or user subscriptions.

Embodiment 18. The system of any of embodiment 15, 16 or 17, wherein the one or more show triggers include one or more of an action currently being performed by the user on the computing device, an action previously performed by the user on the computing device, an action performed by the user on another device, or the user's past experience with a feature associated with the help notification.

Embodiment 19. The system of embodiment 15, 16, 17, or 18, wherein the server is further configured to: access a user profile associated with the user; and identify the audience of users to which the user belongs; wherein the one or more help notifications communicated to the first user device and the second user device are selected from the campaign that is targeted toward the identified audience.

Embodiment 20. The system of embodiment 15, 16, 17, 18, or 19, wherein the server is further configured to limit the total number of help notifications displayed to the user in a given time period.

Aspects of the technology have been described to be illustrative rather than restrictive. It will be understood that certain features and subcombinations are of utility and may be employed without reference to other features and subcombinations. This is contemplated by and is within the scope of the claims.

The invention claimed is:

1. A method of providing contextual help for a computing device, the method comprising:
   receiving, at the computing device, a set of contextual help notifications for presentation to a user, wherein each help notification is associated with
   A) one or more show-trigger conditions which, when satisfied, indicate that the help notification should be presented on a user interface of the computing device, and
   B) a withdraw-trigger condition which, when satisfied, indicates that the help notification should be disabled such that the help notification is not eligible for presentation on the user interface;
   monitoring the computing device for show-trigger conditions and withdraw-trigger conditions;
   prior to presenting a first help notification to the user, determining that the withdraw-trigger condition for the first help notification is satisfied;
   upon the determination that the withdraw-trigger condition is satisfied, disabling the first help notification such that the first help notification is not eligible for presentation on the user interface.

2. The method of claim 1, wherein the contextual help notifications are organized into a campaign that is directed at a specific audience of users.

3. The method of claim 2, wherein the specific audience of users is determined based on at least one of region, operating system upgrade path, device type, device capabilities, or user subscriptions.

4. The method of claim 1, wherein the one or more show-trigger conditions include one or more of an action currently being performed by the user on the computing device, an action previously performed by the user on the computing device, an action performed by the user on another device, or the user's past experience with a feature associated with the help notification.

5. The method of claim 1, wherein monitoring the computing device comprises communicating a result of the monitoring to a server that coordinates the contextual help across multiple computing devices associated with the user.

6. The method of claim 1, comprising:
   determining that show-trigger conditions for a second help notification are satisfied, wherein the show-trigger conditions for the second help notification include
   A) a predetermined amount of time has passed since a predetermined event, and
   B) the user has not performed a predetermined action within the predetermined amount of time since the predetermined event; and
   presenting the second help notification on the user interface.

7. The method of claim 1, comprising:
   determining that a show-trigger condition for a second help notification is satisfied, wherein the show-trigger condition includes at least one of
   A) a predetermined amount of time has passed since a predetermined event, or
   B) determining that the user performed a predetermined action; and
   presenting the second help notification on the user interface.

8. The method of claim 7, further comprising:
   while presenting the second help notification on the user interface, determining an occurrence of a dismiss-trigger condition associated with the second help notification; and
   removing the second help notification from the user interface.

9. A method of providing contextual help for a computing device, the method comprising:
   at a server, accessing a database that stores help notifications for providing the contextual help, wherein each help notification is associated with
   A) one or more show triggers which, when satisfied, indicate that the help notification should be presented to the user, and
   B) a withdraw trigger which, when satisfied, indicates that the help notification should be disabled such that the help notification is not eligible for presentation to the user;
   communicating to a first user device and a second user device one or more of the help notifications for presentation to a user, wherein the user is associated with both the first user device and the second user device;
   receiving a notification from the first user device that the withdraw trigger for a first help notification is satisfied on the first user device; and
   based on receiving the notification from the first user device, sending a notification to the second user device that the withdraw trigger for the first help notification is satisfied.

10. The method of claim 9, wherein the help notifications stored in the database are organized into campaigns that are each directed toward a respective audience of users.

11. The method of claim 10, wherein the respective audience of users is determined based on at least one of region, operating system upgrade path, device type, device capabilities, or user subscriptions.

12. The method of claim 9, wherein the one or more show triggers include one or more of an action currently being performed by the user on the computing device, an action previously performed by the user on the computing device, an action performed by the user on another device, or the user's past experience with a feature associated with the help notification.

13. The method of claim 9, comprising:
   accessing a user profile associated with the user; and
   identifying the audience of users to which the user belongs;
   wherein the one or more help notifications communicated to the first user device and the second user device are selected from the campaign that is targeted toward the identified audience.

14. The method of claim 9, further comprising limiting the total number of help notifications displayed to the user in a given time period.

15. A system for providing contextual help for a computing device, the method comprising:
   a database configured to store help notifications for providing the contextual help, wherein the help notifications are organized into campaigns, wherein each campaign is directed toward a respective audience of users, and wherein each help notification is associated with
   A) a respective set of one or more show triggers which, when satisfied, indicate that the help notification should be presented to the user, and B) a withdraw trigger which, when satisfied, indicates that the help notification should be disabled such that the help notification is removed from future consideration for presentation to the user; and a server device configured to
- A) communicate to a first user device and a second user device one or more of the help notifications for presentation to a user, wherein the user is associated with both the first user device and the second user device, and
- B) receive a notification from the first user device that the withdraw trigger for a first help notification is satisfied on the first user device, and
- C) based on having received the notification from the first user device, send a notification to the second user device that the withdraw trigger for the first help notification is satisfied.

16. The system of claim 15, wherein each help notification is further associated with a dismiss trigger which, when satisfied, indicates that an associated help notification currently displayed on a user interface should be removed from the user interface.

17. The system of claim 15, wherein the respective audience of users is determined based on at least one of region, operating system upgrade path, device type, device capabilities, or user subscriptions.

18. The system of claim 15, wherein the one or more show triggers include one or more of an action currently being performed by the user on the computing device, an action previously performed by the user on the computing device, an action performed by the user on another device, or the user's past experience with a feature associated with the help notification.

19. The system of claim 15, wherein the server is further configured to:
  access a user profile associated with the user; and
  identify the audience of users to which the user belongs;
  wherein the one or more help notifications communicated to the first user device and the second user device are selected from the campaign that is targeted toward the identified audience.

20. The system of claim 15, wherein the server is further configured to limit the total number of help notifications displayed to the user in a given time period.

* * * * *